US009994201B2

(12) United States Patent
Correndo et al.

(10) Patent No.: US 9,994,201 B2
(45) Date of Patent: Jun. 12, 2018

(54) ELECTRO-PNEUMATIC BRAKING SYSTEM FOR A RAILWAY VEHICLE

(71) Applicant: FAIVELEY TRANSPORT ITALIA S. p. A., Piossasco (Turin) (IT)

(72) Inventors: Roberto Correndo, Carmagnola (IT); Roberto Tione, Lauriano (IT)

(73) Assignee: FAIVELEY TRANSPORT ITALIA S. p. A., Turin (IT)

( * ) Notice: Subject to any disclaimer, the term of this patent is extended or adjusted under 35 U.S.C. 154(b) by 0 days. days.

(21) Appl. No.: 15/311,691

(22) PCT Filed: May 28, 2015

(86) PCT No.: PCT/IB2015/054008
§ 371 (c)(1),
(2) Date: Nov. 16, 2016

(87) PCT Pub. No.: WO2015/181764
PCT Pub. Date: Dec. 3, 2015

(65) Prior Publication Data
US 2017/0096128 A1    Apr. 6, 2017

(30) Foreign Application Priority Data

May 28, 2014  (IT) .............................. TO2014A0425

(51) Int. Cl.
*B60T 8/34* (2006.01)
*B60T 8/18* (2006.01)
(Continued)

(52) U.S. Cl.
CPC .......... *B60T 8/1893* (2013.01); *B60T 8/1705* (2013.01); *B60T 13/665* (2013.01); *B60T 17/228* (2013.01); *B61H 11/14* (2013.01); *B60T 8/3235* (2013.01)

(58) Field of Classification Search
CPC ........ B60T 8/18; B60T 8/1705; B60T 8/1893; B60T 11/326; B60T 13/26; B60T 13/665; B60T 13/683
(Continued)

(56) References Cited

U.S. PATENT DOCUMENTS 5,887,953 A * 3/1999 Wood .................... B60T 8/1893
                                                     303/15
6,095,621 A * 8/2000 Wood .................... B60T 8/1881
                                                     303/122.15
(Continued)

FOREIGN PATENT DOCUMENTS

| EP | 0 152 300 A2 | 8/1985 |
| EP | 0 958 980 A2 | 11/1999 |
| WO | 2013/144543 A2 | 10/2013 |

OTHER PUBLICATIONS

International Search Report of PCT/IB2015/054008, dated Sep. 21, 2015. [PCT/ISA/210].

Primary Examiner — Christopher P Schwartz
(74) Attorney, Agent, or Firm — Sughrue Mion, PLLC

(57) ABSTRACT

An electro-pneumatic braking system including a pneumatic pressure supply pipe, a generator for generating a vehicle load signal, a weighting system designed to supply a weighted pressure which defines a maximum braking pressure, limited as a function of the load signal, and braking control units connected to the weighting system and having a relay valve connected between the pipe and at least one brake cylinder, to cause the application to this cylinder of a controllable braking pressure, equal to or less than the weighted pressure. The weighting system includes an electro-pneumatic drive assembly, interposed between the pipe and the drive inlet of the relay valve and is connected to the pipe through a pressure limiter, and an electronic weighting control unit which controls this drive assembly as a function (Continued)

of the load signal, so as to modulate in predetermined ways the pressure at the drive inlet of the relay valve.

10 Claims, 3 Drawing Sheets

(51) Int. Cl.
*B60T 13/66* (2006.01)
*B60T 17/22* (2006.01)
*B60T 8/17* (2006.01)
*B61H 11/14* (2006.01)
*B60T 8/32* (2006.01)

(58) Field of Classification Search
USPC ......... 188/3 H, 3 R, 112 A, 112 R; 303/3, 7, 303/15, 127, 128
See application file for complete search history.

(56) References Cited

U.S. PATENT DOCUMENTS

| | | | |
|---|---|---|---|
| 6,250,723 B1 * | 6/2001 | Barberis | B60T 8/3235 303/15 |
| 7,886,532 B2 * | 2/2011 | Hilberer | B60T 17/02 60/329 |
| 8,172,339 B2 * | 5/2012 | Fries | B60T 17/02 303/11 |
| 8,864,247 B2 * | 10/2014 | Hilberer | B60T 7/20 303/122.1 |
| 2001/0033105 A1 * | 10/2001 | Frank | B60T 8/327 303/20 |
| 2002/0163248 A1 | 11/2002 | Wood et al. | |
| 2004/0119331 A1 * | 6/2004 | Long | B60T 13/665 303/3 |
| 2006/0175894 A1 * | 8/2006 | Battistella | B60T 8/1708 303/7 |
| 2010/0304929 A1 * | 12/2010 | Hilberer | B60T 7/20 477/183 |

* cited by examiner

ELECTRO-PNEUMATIC BRAKING SYSTEM FOR A RAILWAY VEHICLE

CROSS REFERENCE TO RELATED APPLICATIONS

This application is a National Stage of International Application No. PCT/IB2015/054008 filed May 28, 2015, claiming priority based on Italian Patent Application No. TO2014A000425, filed May 28, 2014, the contents of all of which are incorporated herein by reference in their entirety.

BACKGROUND OF THE INVENTION

Field of the Invention

The present invention relates to an electro-pneumatic braking system for a railway vehicle.

Background

More specifically, the present invention relates to an electro-pneumatic braking system comprising
- a pneumatic pressure supply pipe,
- generator means for generating vehicle load or weight signals,
- weighting means designed to supply a weighted pneumatic pressure which defines a maximum braking pressure, limited as a function of the load signals, and
- braking control means connected to the weighting means and comprising a relay valve connected between said pipe and (at least) one brake cylinder, to cause the application to said cylinder of a controllable braking pressure, equal to or less than said weighted pressure.

Electro-pneumatic braking systems of this type are well known, and are described, for example, in patent applications EP 0 958 980 A and WO 2013/144543 A.

There is a general and constant tendency towards the reduction of the size and overall dimensions of these braking systems.

In particular, there is a tendency to construct these systems in the form of line replaceable units (LRU) to allow fast and simple maintenance.

These objectives imply an increased use of electronic and electro-pneumatic systems, in place of the conventional pneumatic componentry which was rather heavy and bulky.

In an electro-pneumatic braking system of the aforesaid type, load signals are generated, indicating the load or weight of the whole vehicle or a part thereof, for example according to whether the braking system is intended to apply the brakes on a vehicle-by-vehicle basis, or on a bogie-by-bogie basis.

In addition to the weighting means and the service braking control means, an electro-pneumatic braking system of this type usually comprises means for controlling the anti-wheel-slip function, designed to block and then reduce the fluid pressure, and subsequently reapply it to the brake cylinders as a function of information supplied by speed sensors associated with the wheels, to resolve situations of wheel locking and slippage.

In some cases, the braking control means and the anti-wheel-slip control means are implemented in a single electronic control unit.

SUMMARY OF THE INVENTION

An object of the present invention is to provide an electro-pneumatic braking system for a railway vehicle, the system being characterized by its drastically reduced size, weight and overall dimensions, highly reliable operation and low cost.

These and other objects are achieved according to the invention with an electro-pneumatic braking system whose principal characteristics are disclosed and claimed herein.

In a braking system according to the present invention, the weighting means comprise
- an electro-pneumatic drive assembly which is interposed between the pressure supply pipe and the drive inlet of the aforesaid relay valve, and which is connected to this pipe via a pressure and power limiter, and
- an electronic weighting control unit which controls this drive assembly as a function of the aforesaid load signal, so as to modulate in predetermined ways the pressure at the drive inlet of this relay valve.

As a result of these characteristics, the weighting means operate on a low-power "pneumatic signal", which can be "processed" by means of pneumatic devices (solenoid valves) having small passage cross sections. These pneumatic devices can therefore be made with markedly smaller sizes and weights than those of the prior art solutions.

In a braking system according to the invention, the aforesaid braking control means comprise
- an electro-pneumatic control assembly, interposed between the electro-pneumatic drive assembly of the relay valve and the drive inlet of said relay valve, and
- an electronic braking control unit, designed to drive this electro-pneumatic control assembly as a function of service or safety braking request signals.

The electro-pneumatic braking control assembly conveniently comprises a first solenoid valve, or inlet valve, which controls the connection between the electro-pneumatic drive assembly and the drive inlet of the relay valve, and a second solenoid valve, or outlet valve, which controls a discharge connection between the drive inlet of this relay valve and the atmosphere, and a third solenoid valve, for the remotely controlled braking release, connected to the inlet of the relay valve and interposed between said first and second solenoid valves.

Regarding the last-mentioned solution, although in the attached claims it is shown as being subject to the presence of the characteristics defined in the claims, it will be evident to those skilled in the art that this solution may conveniently be applied even in the absence of the characteristics defined in the claims.

BRIEF DESCRIPTION OF THE DRAWINGS

Other characteristics and advantages of the invention will be apparent from the following detailed description, which is given purely by way of non-limiting example, with reference to the attached drawings, in which.

DETAILED DESCRIPTION OF THE INVENTION

Figure 1:
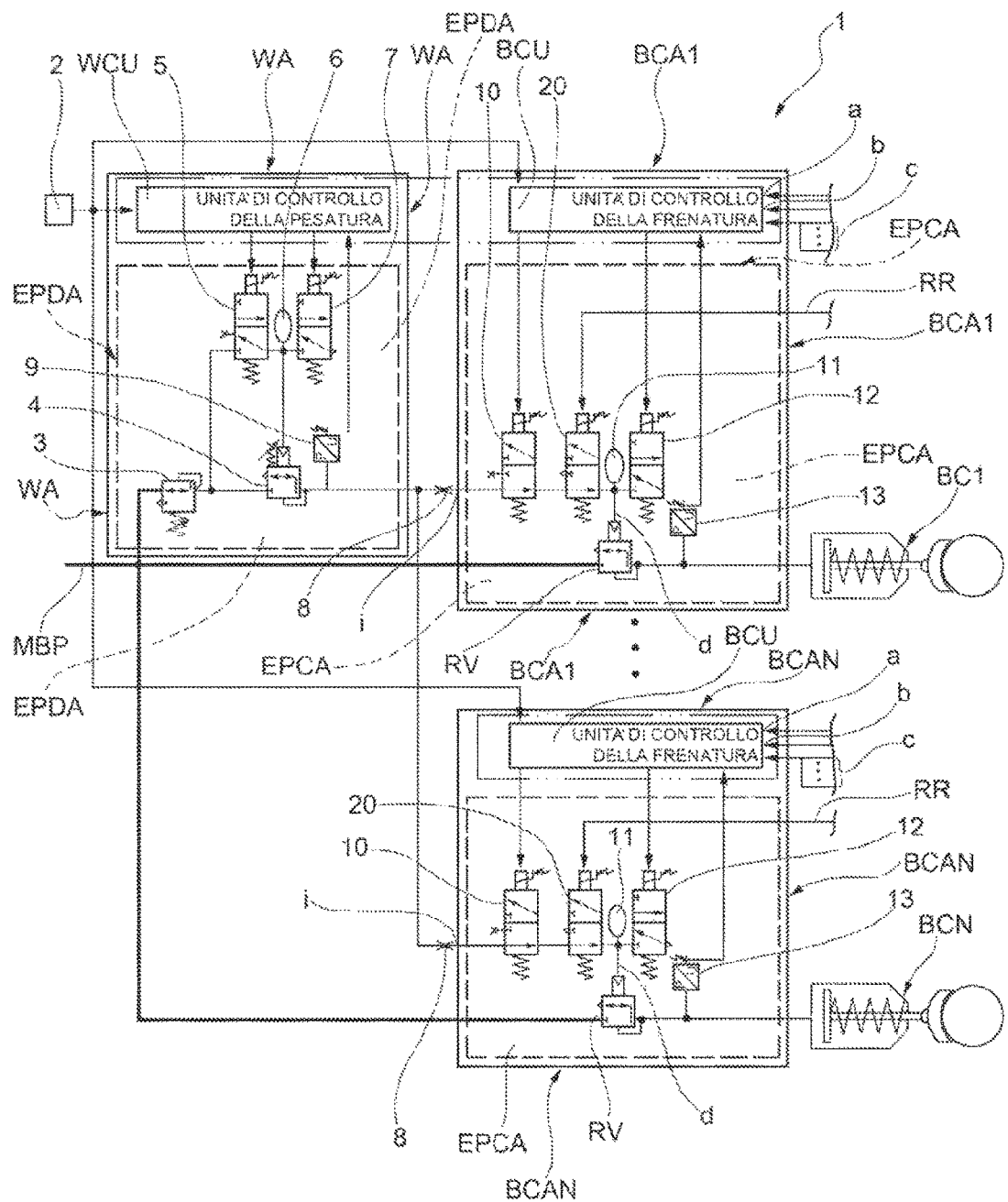
FIG. 1 is an electro-pneumatic diagram, partially in block form, of an electro-pneumatic braking system for a railway vehicle according to the present invention.

In the drawings, the number 1 indicates the whole of an electro-pneumatic braking system according to the present invention, for a railway vehicle of a known type.

In the illustrated embodiment, the braking system 1 comprises a plurality of brake cylinders BC1, . . . BCN, associated with corresponding wheels or axles of the railway vehicle.

Each brake cylinder BC1, . . . BCN is associated with a respective braking control apparatus BCA1, . . . BCAN.

The braking control apparatus BCA1, . . . BCAN are associated with a weighting apparatus indicated as a whole by WA.

The weighting apparatus WA comprises an electronic weighting control unit WCU, which controls an electro-pneumatic drive assembly indicated as a whole by EPDA.

Each braking control apparatus BCA1, . . . BCAN comprises a respective electronic unit BCU which controls an associated electro-pneumatic control assembly EPCA.

The number 2 in FIG. 1 indicates a device for generating signals indicative of the load or weight of the vehicle (or of a part thereof, such as a bogie), connected to the electronic unit WCU of the weighting apparatus WA, and to the electronic units BCU of the braking control apparatus BCA1, . . . BCAN.

The electronic units WCU and BCU may be made in the form of free-standing electronic units, or may if necessary be integrated with one another in a single electronic control unit.

The symbol MBP indicates a main pneumatic pressure supply pipe (known as the "main brake pipe").

In each electro-pneumatic control assembly EPCA, the pneumatic pipe MBP is connected to the inlet of a relay valve RV, the outlet of which is connected to the associated brake cylinder BC1, . . . BCN.

The relay valves RV are "power" valves.

The electro-pneumatic weighting assembly EPDA is pneumatically interposed between the pressure supply pipe MBP and a pneumatic "signal" inlet, indicated by i, of each of the electro-pneumatic control assemblies EPCA.

As will be evident from the following description, the weighting apparatus WA is designed to supply a pneumatic pressure "signal" to the drive inlets d of the relay valves RV of the braking control apparatus BCA1, . . . BCAN, this signal consisting of a "weighted" pneumatic pressure defining the maximum braking pressure, limited as a function of the load signal supplied by the sensor 2, and applicable to the brake cylinders BC1, . . . BCN.

On the other hand, each braking control apparatus BCA1, . . . BCAN is designed to cause the application, to at least one brake cylinder BC1, . . . BCN associated with this apparatus, of a braking pressure which does not exceed said weighted pressure, and is, in general, variable as a function of the level of service braking requested, or of the safety braking request, which reach the respective electronic unit BCU at its inputs indicated by a and b respectively.

Conveniently, the unit BCU of each braking control apparatus BCA1, . . . BCAN is also designed to drive the relay valve RV of the associated electro-pneumatic assembly EPCA in such a way as to provide an anti-wheel-slip action when wheel rotation speed signals, supplied to its inputs indicated cumulatively by c, enable a locked condition of these wheels to be detected.

With reference to FIG. 1, the electro-pneumatic drive assembly EPDA is connected to the pneumatic pressure supply pipe MBP through a pneumatic pressure limiter valve 3, the outlet of which is connected to the supply inlet of a relay valve 4, of the type having an opposing spring, and to the inlet of a solenoid inlet valve 5 driven, in operation, by the weighting control unit WCU.

The solenoid valve 5 has its outlet connected to a small reservoir 6, as well as to the drive inlet of the relay valve 4 and to the inlet of a solenoid outlet valve 7 which, in operation, is also driven by the weighting control unit WCU.

In the illustrated embodiment, the solenoid valves 5 and 7 are three-way two-position valves which are normally closed.

The outlet of the relay valve 4 is connected to the inlet i of the electro-pneumatic control assembly EPCA of the braking control apparatus BCA1, . . . BCAN through a respective constriction 8.

The electro-pneumatic drive assembly EPDA of the weighting apparatus WA further comprises an electric pressure sensor or transducer 9, connected to the pipe which links the outlet of the relay valve 4 to the inlet i of the electro-pneumatic braking control assemblies EPCA. The electrical output of this sensor or transducer 9 is connected to a corresponding input of the weighting control unit WCU, to indicate to the latter, in operation, the pressure at the outlet of the relay valve 4.

The reservoir 6 acts as a "pneumatic storage unit" in which, in operation, a pressure corresponding to the weight of a vehicle, or of a part thereof, is stored.

Figure 2:
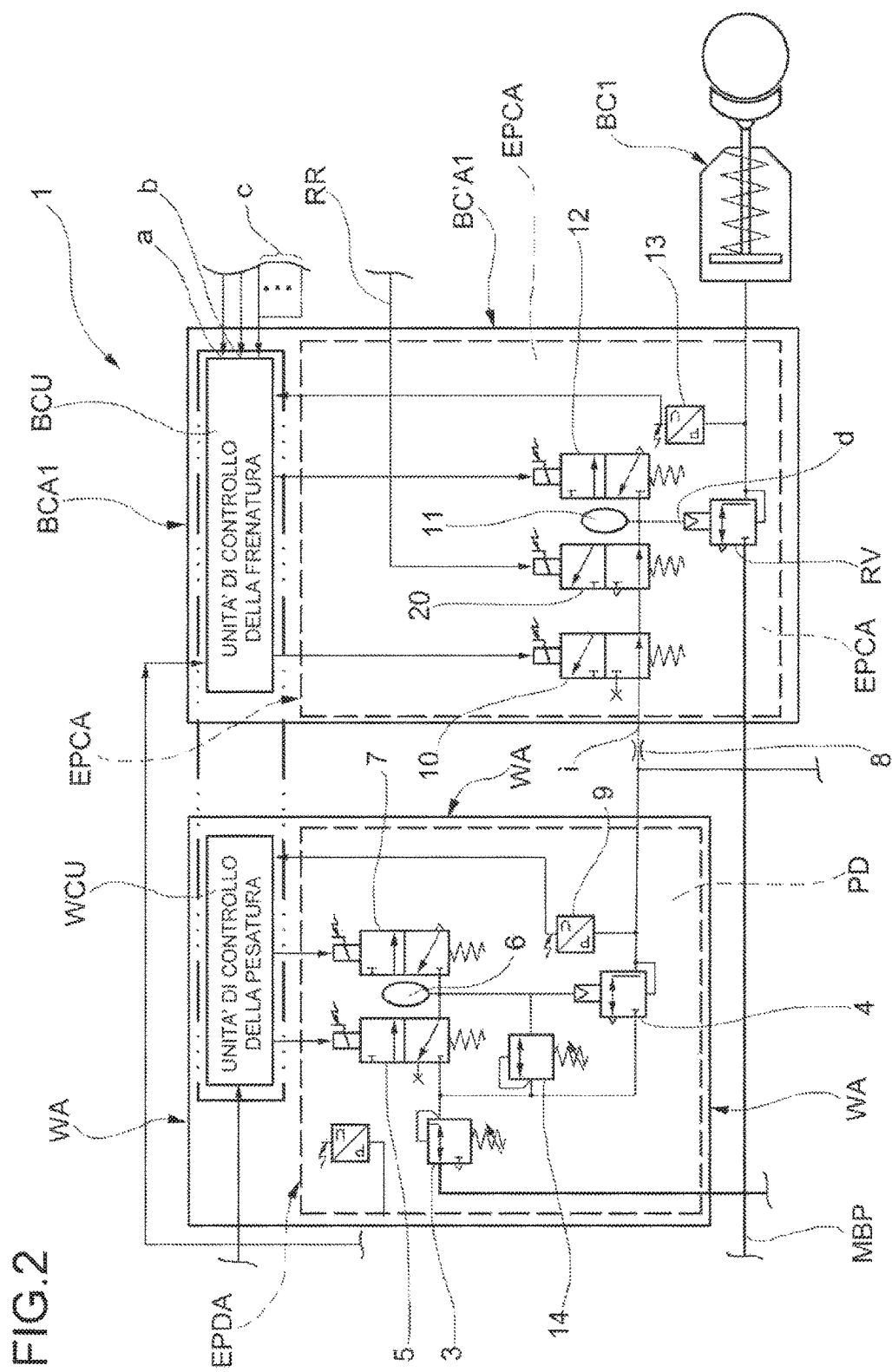
FIG. 2 is a partial electro-pneumatic diagram, similar to that shown in FIG. 1, and shows a first variant embodiment.
Figure 3:
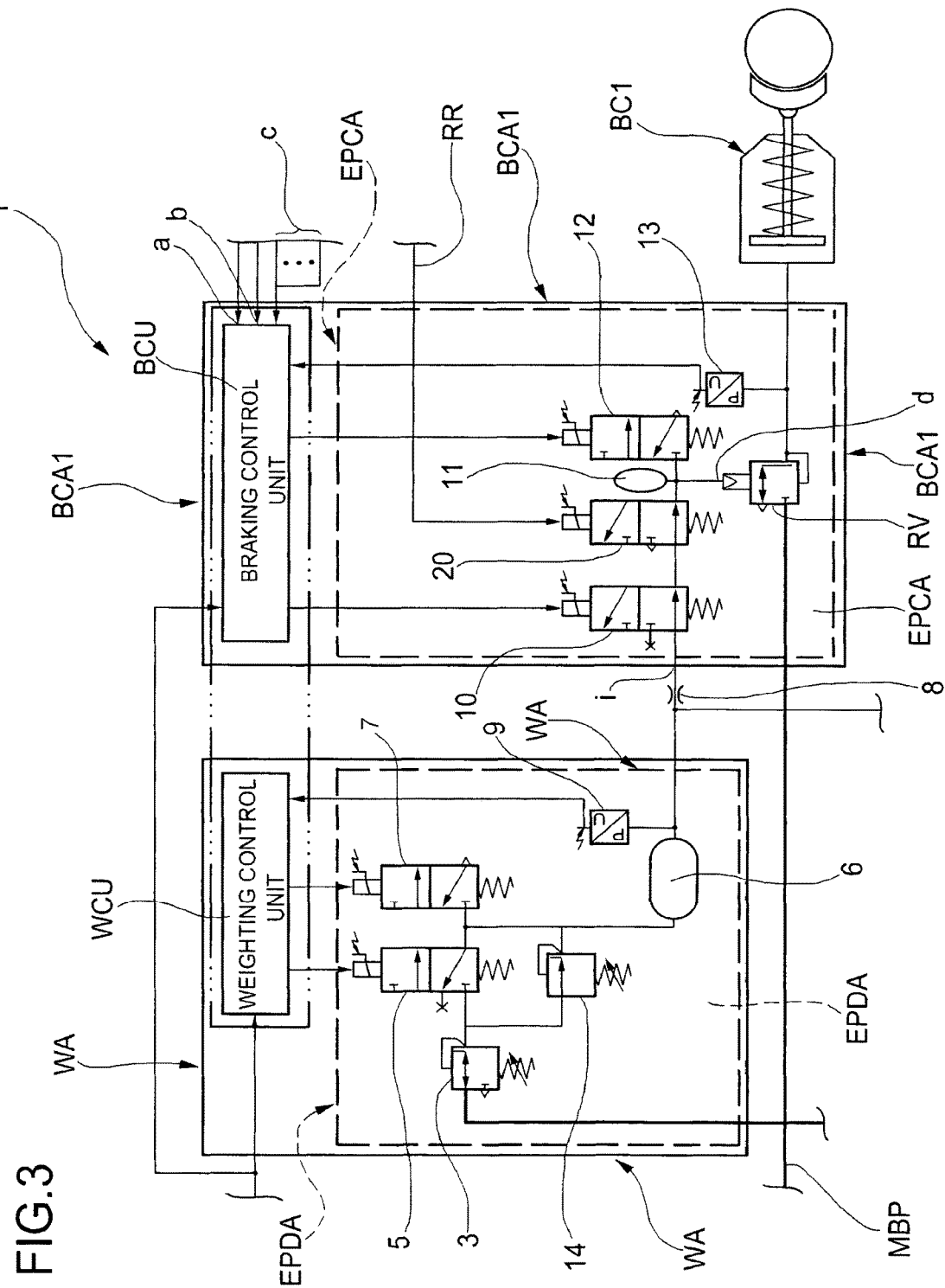
FIG. 3 is an electro-pneumatic diagram, similar to those shown in the preceding figures, and shows a further variant embodiment of the electro-pneumatic braking system according to the present invention.

With reference to FIGS. 1 to 3, in the illustrated embodiment each electro-pneumatic braking control assembly EPCA comprises a solenoid inlet valve 10, driven, in operation, by the corresponding braking control unit BCU.

The solenoid valve 10 in the illustrated embodiment is of the three-way, two-position, normally open type, and has its outlet connected to the inlet of a further solenoid valve 20, the outlet of which is connected to the drive inlet d of the relay valve RV.

The outlet of the solenoid valve 20 is also connected to a small reservoir 11 and to the inlet of a solenoid outlet or discharge valve 12, also controlled in operation by the electronic braking control unit BCU.

The solenoid valve 20 is of the three-way, two-position, normally open type, while the solenoid valve 12 is of the three-way, two-position, normally closed type.

As will be more clearly apparent from the following text, the solenoid valve 20 is intended to cause, when energized, the release of the braking by the associated brake cylinder BC1, . . . BCN.

A pressure sensor or transducer 13 is connected pneumatically between the outlet of the relay valve RV and the associated brake cylinder BC1, . . . BCN, in order to supply, in operation, an electrical signal indicative of the pressure at the outlet of said relay valve RV to the corresponding electronic braking control unit BCU.

The electro-pneumatic braking system described above with reference to FIG. 1 operates essentially in the following way.

The electronic weighting control unit WCU receives from the device 2 a signal indicative of the weight of the railway vehicle or of a part thereof, such as a bogie, according to whether the braking system 1 is designed to provide "vehicle-by-vehicle" braking or "bogie-by-bogie" braking.

The weighting control unit WCU controls the solenoid inlet valve 5 and the associated solenoid outlet valve 7 in such a way that, when these solenoid valves are de-energized, the first valve (5) disconnects the reservoir 6 from the outlet of the pressure regulator 3, and the second valve (7) prevents the reservoir 6 from discharging into the atmosphere.

The reservoir 6 conveniently has a capacity essentially corresponding to the volume of the drive chamber of the relay valve 4 and of the piping connecting the solenoid valves 5 and 7 to this relay valve.

When the solenoid inlet valve 5 is energized, it connects the reservoir 6 to the outlet of the pressure limiter 3.

When the solenoid outlet or discharge valve 7 is energized, it allows the pressure previously accumulated in the reservoir 6 and in the drive chamber of the relay valve 4 to be discharged into the atmosphere.

The pressure sensor or transducer 9 supplies an electrical signal indicative of the pressure instantaneously present at the outlet of the relay valve 4 to the electronic weighting control unit WCU.

On the basis of the signal supplied by the pressure sensor or transducer 9, and by driving the solenoid inlet valve 5 and the solenoid outlet or discharge valve 7, the control unit WCU acts in such a way that a weighted pneumatic pressure is present at the outlet of the relay valve 4, this pressure defining the maximum value of the braking pressure applicable to the brake cylinders BC1, . . . BCN. This maximum value of the braking pressure is limited as a function of the load value indicated by the signals supplied by the device 2.

The inlet pressure limiter device 3 prevents the pressure at the inlet of the solenoid valve 5 and of the relay valve 4 from exceeding a predetermined maximum value, thereby also fixing the maximum value that the pneumatic pressure can reach at the outlet of the relay valve 4.

The pressure at the outlet of the relay valve 4, that is to say at the outlet of the electro-pneumatic drive assembly EPDA, arrives at the inlets i of the electro-pneumatic braking control assemblies EPCA associated with the various brake cylinders BC1, . . . BCN.

In each electro-pneumatic braking control assembly EPCA, when the solenoid valves 10, 20 and 12 are de-energized, that is to say in the condition shown in FIG. 1, the pneumatic pressure received from the relay valve 4 reaches the reservoir 11 and the drive chamber of the relay valve RV, through the solenoid valves 10 and 20. The reservoir 11 and the drive chamber of the relay valve RV are disconnected from the atmosphere, because the solenoid discharge valve 12 is closed.

The volume of the reservoir 11 corresponds to the overall volume of the drive chamber of the relay valve RV and the volume of the pipes connecting this reservoir to the solenoid valves 20 and 12, and to the drive inlet d of the relay valve RV.

In operation, each braking control unit BCU receives the load or weight information from the device 2, the information element about the pressure at the outlet of the corresponding relay valve RV from the associated sensor or transducer 13, and the information relating to any service or emergency braking request at its inputs a and b, as well as the information relating to the rotation speed of the wheels of the vehicle, at its inputs c.

During the normal running of the railway vehicle, each braking control unit BCU controls the value of the pressure at the outlet of the relay valve RV in such a way that this pressure is proportional to the weighted drive pressure sent to its inlet d by the relay valve 4 of the electro-pneumatic drive assembly EPDA, and proportional to the service braking request signal applied to the input a of this unit BCU.

If there is a safety or emergency braking request which arrives at the input b of the braking control units BCU, these units cause the associated solenoid inlet valves 10 to be de-energized, allowing the relay valve 4 to fill the reservoir 11 with fluid at the outlet pressure of said relay valve 4, or of the electro-pneumatic drive assembly EPDA of the weighting apparatus WA. The solenoid discharge valve 12 prevents the discharge of the reservoir 11 into the atmosphere.

Consequently, in the presence of a safety braking request, the relay valve RV supplies to the associated brake cylinder a flow of fluid whose pressure corresponds to the weighted pressure determined by the electro-pneumatic drive assembly EPDA, as described above.

When a braking control unit BCU, on the basis of the signals relating to the rotation speed of the wheels of the vehicle supplied to its inputs c, detects a wheel slip condition, this causes a reduction of the braking pressure at the associated brake cylinder, by energizing the solenoid inlet valve 10 and de-energizing the solenoid outlet valve 12, until the slip condition is resolved.

The solenoid valve 20 can be energized by means of a remote braking release control signal (remote release signal) RR. The energizing of the solenoid valve 20 in one direction prevents the solenoid inlet valve 10 from filling the reservoir 11 with the pressurized fluid received from the relay valve 4; instead, it causes this reservoir 11 and the drive chamber of the relay valve RV to discharge into the atmosphere.

Consequently, when the solenoid valve 20 is energized, the relay valve 20 reduces the braking pressure at the associated brake cylinder, preventing this cylinder from causing a retarding action.

The positioning of the solenoid valve 20, which enables the brake release to be controlled, between the solenoid inlet valve 10 and outlet valve 12 is such that it does not affect the speed of the air flow between the drive chamber of the relay valve RV and the solenoid discharge valve 12.

This positioning of the solenoid valve 20 prevents the emptying of the storage chamber of the relay valve RV from being slowed down in the course of anti-wheel-slip braking.

FIG. 2 is a partial illustration of a first variant embodiment. In this drawing, parts and elements described previously have again been given the same alphanumeric references as those used previously.

The variant according to FIG. 2 differs from the braking system according to FIG. 1 essentially in that the relay valve 4 of the electro-pneumatic drive assembly EPDA of the weighting apparatus WA is of the type having no return spring, and in that a further pressure limiter 14 is interposed between the drive inlet of this relay valve and the outlet of the pressure reducer 3.

By its presence, the pressure reducer 14 causes the pressure in the reservoir 6 to have a predetermined minimum value, and therefore stabilizes the minimum value of the pneumatic pressure deliverable at the outlet of the electro-pneumatic drive assembly EPDA.

FIG. 3 is a partial illustration of a further variant embodiment.

In this drawing also, parts and elements identical to or corresponding to parts and elements described previously have again been given the same alphanumeric references as those used previously.

By contrast with the variant shown in FIG. 2, in the solution according to FIG. 3 the electro-pneumatic drive assembly EPDA of the weighting apparatus WA no longer has a relay valve. The outlet of this electro-pneumatic assembly EPDA is taken to the reservoir 6, which acts as a "pneumatic storage" reservoir in which, in operation, a pressure corresponding to the weight of the vehicle is stored, in a similar manner to that of the solution known from European Patent EP 0 958 980 B1, which, however, provides for the use of a further relay valve which supplies pressure directly to the brake cylinders.

In operation, the weighting control unit WCU provides continuous regulation of the pneumatic pressure in the reservoir 6 when pressure variations are present in the drive chambers of the relay valves RV of the electro-pneumatic braking control assemblies EPCA, both in service braking and in emergency anti-wheel-slip braking.

In the embodiment according to FIG. 3, the volume of the reservoir 6 is conveniently at least ten times the sum of the volumes of the drive chambers of the relay valves RV, in order to provide "soft" control.

The pressure in the reservoir 6 may be controlled on the basis of a predetermined algorithm, for example on the basis of the following expression:

$$\sum_{i=0}^{N}[V_i x P_i(t)] = P_{SB}x \sum_{i=0}^{n} V_i \text{ or:}$$

$$P_o(t) = \frac{P_{SB}x \sum_{i=o}^{N} V_i - \sum_{i=0}^{n} V_i x P_i(t)}{V_o}$$

where
Po and Vo are the pneumatic pressure and the volume of the reservoir 6,
t is time,
$P_{SB}$ is the applied emergency or safety pressure, and
$P_i$ and $V_i$, where i=1, 2, ... N, are the pressures and volumes of the reservoirs 11 of the electro-pneumatic assemblies EPCA of the braking control apparatus $BCA_i$.

In emergency braking, the control unit WCA "consumes" some of the air stored in the reservoir 6, but subsequently replaces the consumed amount of air therein by following a predictive algorithm, such as that shown above, on the basis of the (known) volumes of the circuits and the pneumatic components making up these circuits, and on the basis of the instantaneous pneumatic pressures detected by means of the sensors or transducers 9 and 13.

In the diagram of FIG. 3, the reservoir 11 does not necessarily represent an actual "physical" reservoir, but may simply represent the volume of the drive chamber of the relay valve RV and of the connections between this relay valve and the valves 10, 20 and 12.

The solution according to FIG. 3 is notably economical, since it is no longer necessary to use a relay valve in the electro-pneumatic drive assembly EPDA of the weighting apparatus WA.

Naturally, the principle of the invention remaining the same, the forms of embodiment and the details of construction may be varied widely with respect to those described and illustrated, which have been given purely by way of non-limiting example, without thereby departing from the scope of the invention as defined in the attached claims.

The invention claimed is:

1. Electro-pneumatic braking system (1) for a railway vehicle, comprising:
   a pneumatic pressure supply pipe;
   generator means for generating a vehicle load signal;
   weighting means configured to supply a weighted pneumatic pressure which defines a maximum braking pressure, limited as a function of the load signal; and
   braking control means connected to the weighting means and comprising a relay valve connected between said pipe and at least one brake cylinder, to cause the application to said cylinder of a controllable braking pressure, equal to or less than said weighted pressure;
   wherein
   the weighting means comprise an electro-pneumatic drive assembly, which is interposed between said pipe and the drive inlet of said relay valve and is connected to said pipe through a pressure limiter, and an electronic weighting control unit which controls said drive assembly as a function of said load signal, so as to modulate in predetermined ways the pressure at the drive inlet of said relay valve.

2. Electro-pneumatic braking system according to claim 1, wherein said braking control means comprise:
   an electro-pneumatic control assembly interposed between said electro-pneumatic drive assembly and the drive inlet of said relay valve; and
   an electronic braking control unit configured to drive said electro-pneumatic control assembly as a function of braking request signals.

3. Electro-pneumatic braking system according to claim 2, wherein the electro-pneumatic braking control assembly comprises a first solenoid valve which controls the connection between said electro-pneumatic drive assembly and the drive inlet of the relay valve, and a second solenoid valve which controls a discharge connection between the drive inlet of the relay valve and the atmosphere, while said solenoid brake release valve means comprise a third solenoid valve, interposed between said first and second solenoid valves.

4. Electro-pneumatic braking system according to claim 1, wherein said braking control means further comprise solenoid brake release valve means configured to cause the discharge of the pressure in said at least one brake cylinder.

5. Electro-pneumatic braking system according to claim 1, wherein the electro-pneumatic drive assembly comprises:
   a further relay valve having an inlet connected to the outlet of said pressure limiter; and
   an outlet connected to an inlet (i) of said braking control means, and a drive inlet connected to solenoid valve means which control its connection to the outlet of said pressure limiter.

6. Electro-pneumatic system according to claim 5, wherein said solenoid valve means comprise:
   a solenoid inlet valve, normally closed, interposed between the outlet of said pressure limiter and the drive inlet of said further relay valve;
   a solenoid outlet or discharge valve normally closed, interposed between the drive inlet of said further relay valve and the atmosphere; and
   a pressure accumulator connected between said solenoid inlet valve and the solenoid outlet or discharge valve.

7. Electro-pneumatic system according to claim 5, wherein an electric pressure transducer is connected to the outlet of said further relay valve to supply signals to the electronic weighting control unit indicative of the pressure at the outlet of said further relay valve.

8. Electro-pneumatic braking system according to claim 1, wherein said electro-pneumatic drive assembly comprises storage means configured to store an information element indicating the vehicle load or a part thereof, and is configured to cause, in emergency braking, the application to said relay valve of a pressure whose value is a function of the load value stored in said storage means.

9. Electro-pneumatic braking system according to claim 8, wherein said electro-pneumatic drive assembly is configured to cause, using solenoid valve means, the storing of a pressure corresponding to the load of the vehicle or a portion thereof in a pneumatic storage reservoir associated with an electronic transducer configured to supply signals to the electronic weighting control unit indicative of the pressure stored in said storage reservoir.

10. Electro-pneumatic braking system according to claim 9, wherein in emergency braking pressurized air is discharged from said storage reservoir, and the electronic weighting control unit is designed to restore the pressure in said storage reservoir subsequently by following a predetermined algorithm.

* * * * *